Feb. 21, 1967 W. T. DONOFRIO 3,304,652
MODEL SLOT TYPE RACING CAR WITH DIFFERENTIAL FRONT WHEEL DRIVE
Filed Feb. 7, 1966 2 Sheets-Sheet 1
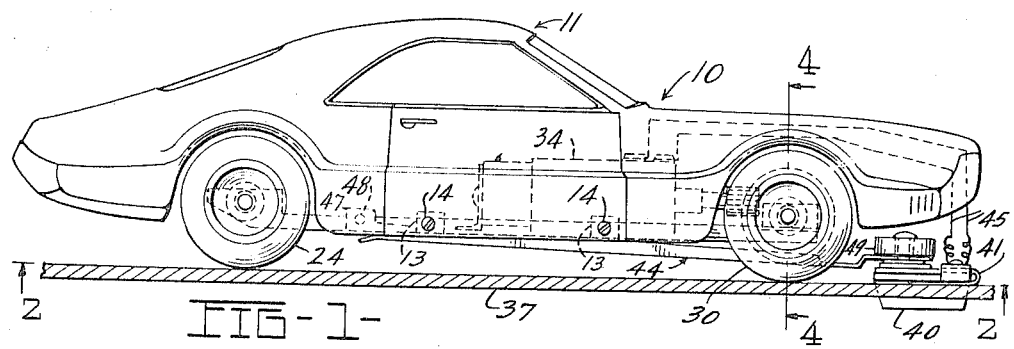
FIG-1-
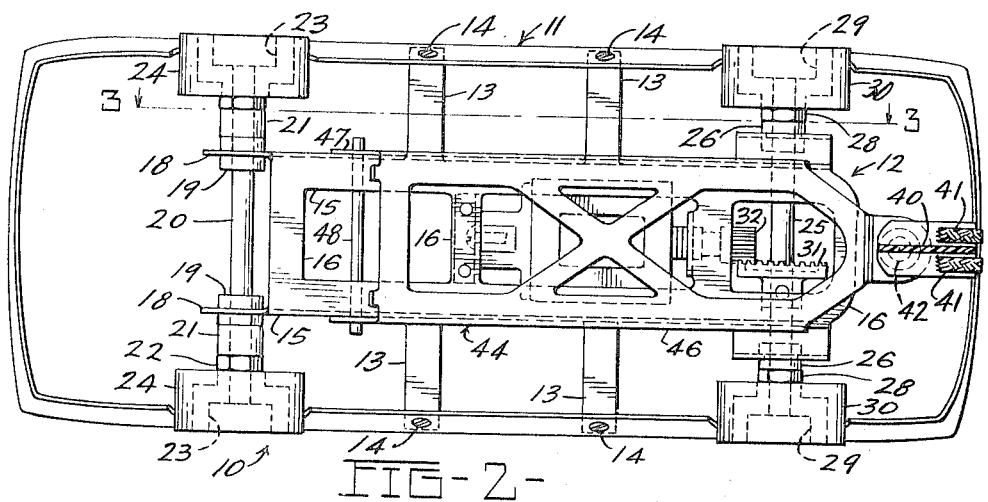
FIG-2-
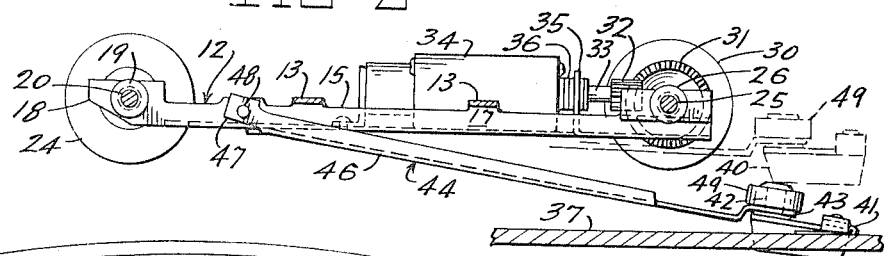
FIG-3-
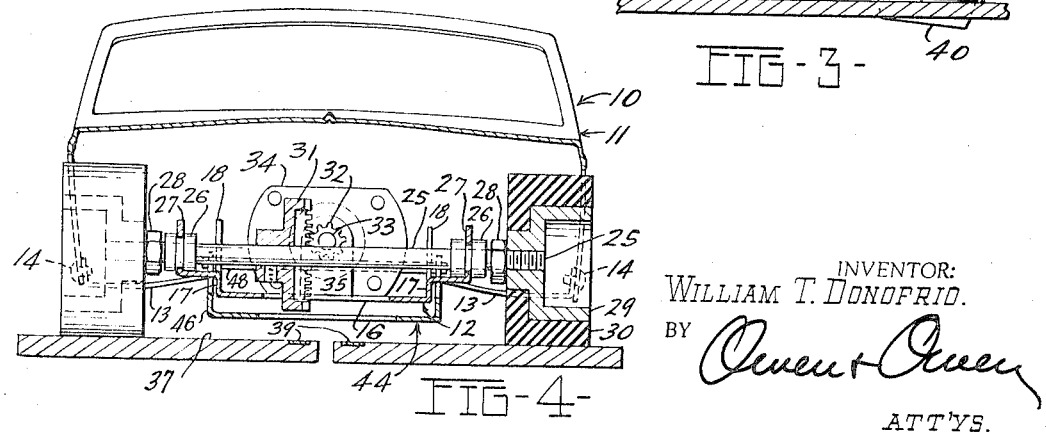
FIG-4-
INVENTOR:
WILLIAM T. DONOFRIO.
BY Owen + Owen
ATT'YS.

Feb. 21, 1967 W. T. DONOFRIO 3,304,652
MODEL SLOT TYPE RACING CAR WITH DIFFERENTIAL FRONT WHEEL DRIVE
Filed Feb. 7, 1966 2 Sheets-Sheet 2
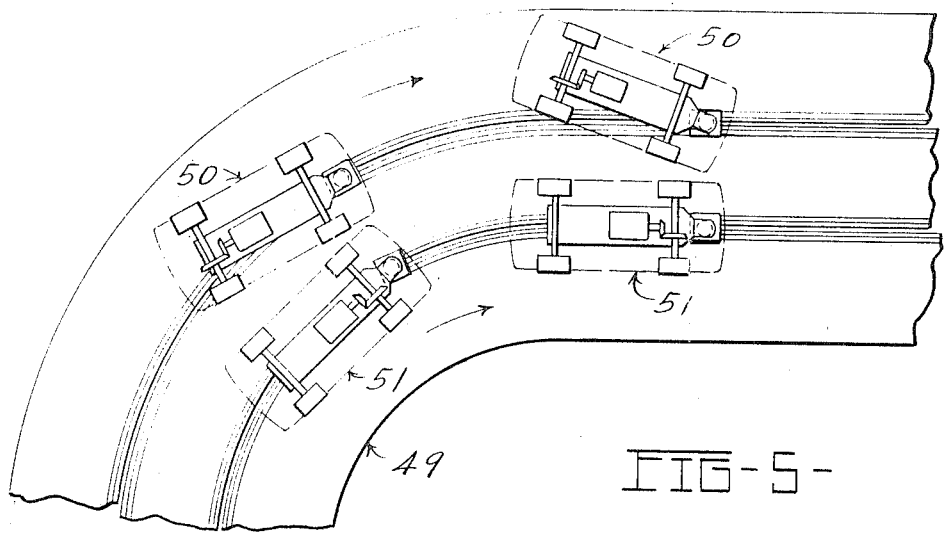
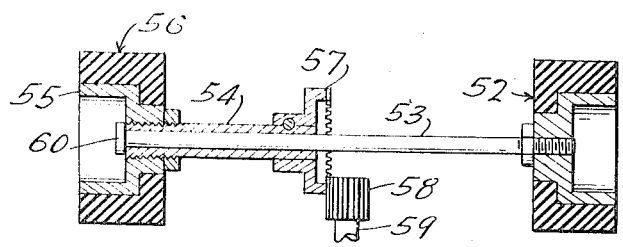
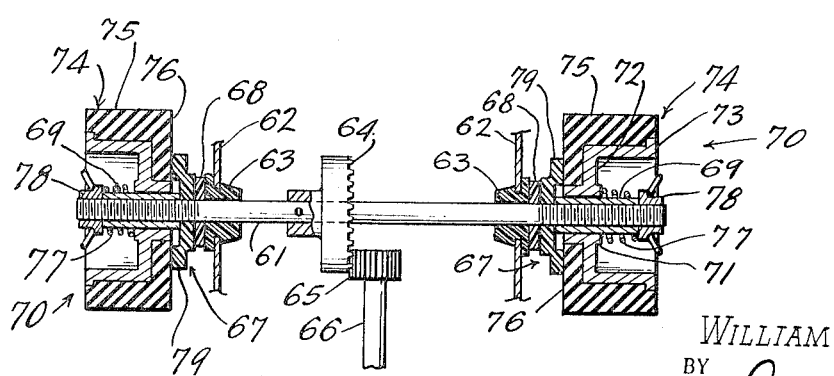
INVENTOR:
WILLIAM T. DONOFRIO.
BY Owen + Owen
ATT'YS.

United States Patent Office 3,304,652
Patented Feb. 21, 1967

3,304,652
MODEL SLOT TYPE RACING CAR WITH
DIFFERENTIAL FRONT WHEEL DRIVE
William T. Donofrio, Toledo, Ohio, assignor to Donofrio
& Company, Toledo, Ohio, a corporation of Ohio
Filed Feb. 7, 1966, Ser. No. 525,439
2 Claims. (Cl. 46—243)

This application is a continuation-in-part of my co-pending application Serial No. 509,989 filed November 26, 1965, now abandoned.

This invention relates to slot type racing cars of the type which are scale models of automobiles and which are self-propelled along slotted roadways by electric motors, the energy for the motors being picked up from brushes or contactors carried by the car and which are engaged with continuous contact strips extending along the roadway.

Slot type racing models are usually scaled down to 1/24 or 1/32 of their real counterparts and have bodies designed to simulate the shapes of the bodies of the respective cars of which they are models. The cars are equipped with the conventional four wheels and an electric motor and usually driven by a transmission comprising a pinion on the end of the electric motor shaft which is engaged with a ring gear secured to the rotatable rear axis of the car. The wheels are provided with rubber tires, sometimes of scale size and design, in that they are proportional to the size of the vehicle, and in other cases the tires may have larger tread surfaces in order to increase the traction of the model car on the roadway.

The guiding means for such a racer usually consists of a guide bar pivotally mounted at the front and which extends downwardly into the slot in the roadway. While it has been suggested that the front wheels should be steered either automatically by the guide which engages the road slot or by a control actuated by the "driver," for the most part front wheel turning mechanisms have been abandoned and the average slot type racing car does not have steerable front wheels.

Because the electric motors which are used for powering the slot type racing cars have considerable torque and speed for their size and weight, and because the tracks have curves of varying radii some of which are quite sharp, even though banked, in an attempt to simulate road racing conditions, a high degree of skill is necessary in operating the power control for a car in order to reach the maximum speed possible not only on the straightaway but also on curves. It is easy to see that if the car enters a curve at too high a speed, it will rather easily "spin out." This may, indeed be so violent as to cause the car to leave the track or, at least, to swing its rear end widely sideways from the slot in which it is being guided causing a loss of speed and resulting in that particular operator losing the race.

Powering the rear wheels of small racers of this type with such powerful motors relative to their weights aggravates the difficulty of racing through curved portions of the track because even when the driver causes the car to enter the track at an appropriate speed and endeavors to increase speed while going through or coming out of the curve, the application of additional power to the rear wheels of the vehicle will frequently cause the vehicle to slew even more widely relative to its guide slot, sometimes resulting in the car being broadside to the track and bringing it to an almost complete stop. Under these conditions, of course, if additional power is applied to the rear wheels, the skid is not corrected and it is necessary sometimes to remove almost all of the power from the wheels in order to allow the wheels to regain traction on the roadbed and, through resolution of the forces acting against the slot, cause the car to realign itself with the slot and move forwardly around the track.

It is the principal object of the instant invention to improve the handleability of a slot type racing car, particularly with respect to the operator's ability to take curves at relatively high speed, to lessen the chances of spinning out, and to improve the ability of the car to return to its correct path of movement after it has skidded.

It should also be pointed out that most slot type racing cars have drive axles which are rotatable so that both of the rear wheels are turned at the same speed and, of course, when the car is moving through a curve, one of the rear wheels must skid on the roadbed because the inside wheel in the turn need not travel as far as the outside wheel in the turn.

It is therefore, another object of the instant invention to provide a slot type racing car equipped with a simple differential means whereby only one of the driving wheels of a slot type model racing car is powered at least during its movement along a curved portion of the roadway.

These and other more specific objects and advantages of a slot type model racing car embodying the invention will be better understood from the specification which follows and from the drawings, in which:

FIG. 1 is a side view in elevation of a slot type model racing car embodying the invention;

FIG. 2 is a bottom view of the car shown in FIG. 1;

FIG. 3 is a fragmentary view partly in elevation and partly in section, taken from the position indicated by the line 3—3 of FIG. 2;

FIG. 4 is a vertical cross-sectional view taken along the line 4—4 of FIG. 1 and shown on an enlarged scale;

FIG. 5 is a fragmentary plan view of a slot type racing roadway showing a conventional rear powered slot type racing car in the position it assumes relative to the track while moving through a curve and upon leaving a curve to enter a straightaway, and also illustrating how an improved slot type racing car according to the invention maintains a better attitude relative to both the curve and the entry into the straightaway under similar operating conditions;

FIG. 6 is a fragmentary cross-sectional view of a power axle of a slot type model racing car embodying the invention in a modification whereby only one of the driving wheels is powered, the other one being free running to eliminate the problem of wheel slippage encountered when both wheels are driven and the car is moving through a curve; and FIG. 7 is a fragmentary sectional view similar to FIG. 6 and illustrating a further modification of a power transfer mechanism to result in powering only one wheel when the racer is moving through a curve, in this case it being the wheel at the inner side of the curve.

In FIG. 1 there is shown a slot type model racing car generally indicated by the reference number 10 which has a body 11 scaled and styled according to a current model of full size automobile, in this case an Oldsmobile "Toronado," which is a front wheel drive, high speed, sport type automobile. The body 11 of such a model racer may be fabricated, for example, by a vacuum forming process from lightweight, relatively thin plastic material such as acetate or butyrate or, if more weight is desired, it may be formed from sheet metal stamping.

Windows may or may not be included in the configuration or there may simply be left openings in simulation of windows. In any event, in order to simplify the construction of the racer 10, the body 11 is shown as being mounted on a main channel shaped frame 12 by means of outwardly extending, parallel body braces 13 of which two are shown on each side of the frame 12. The ends of the body braces 13 are turned upwardly to match the configuration of the skirts of the body 11 and are illustrated as being attached to the skirts of the body 11 by machine screws 14. The construction of the body and the body mounting braces 13 so far described is merely illustrative of the way in which such bodies may be assembled to a frame for a racer of this type to provide for lightweight and ease of disassembly to facilitate access to the operative portions of the racer. Other means have been employed in different slot type racing models, in some cases the bodies having flanges which snap in place around the frames or vice versa.

The main frame 12 is generally flat having parallel, spaced side bars 15 connected to each other by several longitudinally spaced cross bars 16. Each of the side bars 15 has an upwardly turned flange 17 extending throughout its length (see also FIG. 3). Vertically extending ears 18 are the rear ends of the side flanges 17 are bored to receive grooved bushings 19 which function as bearings for a rear axle 20. The bushings 19 should be molded, for example, from a material such as nylon so that they are deformable and can be snapped in place in the bores in the ears 18. At the outer sides of the bushings 19, the axle 20 extends through tubular spacers 21 and the outermost ends of the axle 20 are threaded to receive spacing nuts 22 and the bored and threaded hubs of wheel discs 23 (see also FIG. 4) on which are positioned tires 24.

In this embodiment of the invention a solid front axle 25 is journaled by a pair of grooved bushings 26 similar to the bushings 19 by which the rear axle is journaled. The grooved bushings 26 are positioned in aligned horizontal bores in a pair of upwardly turned and outwardly spaced front ears 27 at the front end of the main frame 12. As in the case of the rear axle 20, the front axle 25 is threaded at both ends to receive spacing nuts 28 and front wheel discs 29 which receive front wheel tires 30.

A driven ring gear 31 is secured to the front axle 25 by a pin or set screw at a position between the side flanges 17 of the main frame 12 and, of course, between the front wheels. The ring gear 31 is meshed with a drive pinion 32 which is mounted on the front end of a drive shaft 33 of an electric motor 34. The electric motor 34 is mounted on and carried by the main frame 12 between a pair of upwardly turned, spaced tabs 35, in this case struck out of the body of the main frame 12, and the front one of which also functions to retain a bearing 36 for the drive shaft 33.

It can be thus observed in FIGS. 1 and 3 that the location of the electric motor 34 relative to the two axles 20 and 25 is such that it lies closer to the front axle 25 than it does to the rear axle 20. This position for the motor 34 is selected according to the instant invention in order that a considerably larger portion of its weight rests on the front wheels in order to increase the traction between the front wheel tires 30 and the surface of a slot type roadway 37 upon which the car 10 runs.

The roadway 37 has a slot 38 (particularly FIG. 4) for each of the racing tracks provided on the particular roadway. In a set for the home there are usually two tracks on a roadway so that two operators may race their cars against each other, each upon its own track. In a "commercial" track, where individual contestants may bring their own cars to the track, and in which the track may be as much as two or three hundred feet long, there usually are provided four to eight individual tracks on the roadway. In any event, each of the tracks has a center slot which is bordered by a pair of continuous contact strips 39 extending along the sides of the slot 38.

Each slot type racer, whether it be of the conventional rear wheel drive or of the new front wheel type embodying the invention, carries a guide 40 of such width to fit freely into the slot 38 in the roadway 37 and of sufficient length so as to not be rotatable in the slot and thus to keep each of a pair of contact brushes 41 carried by the guide 40 in contact with its respective one of the continuous contact strips 39. The guide 40 is mounted for pivotal motion on a vertical axis relative to the car 10. In the illustrated embodiment, the pivot is provided by a pin 42 which extends upwardly through a horizontal ear 43 located at the front end of a pivotally mounted guide frame 44. The two contact brushes 41 are electrically connected to the motor 34 by flexible lead wires 45 (see FIG. 1).

The guide frame 44 comprises a pair of parallel side channels 46 connected by cross braces and having vertical ears 47 at their rear ends. A pivot pin 48 extends horizontally across through the side flanges 17 of the main frame 12 and through the ears 47 to provide for vertical pivoting of the guide frame 44 between the positions shown in solid and dotted lines in FIG. 3.

A weight 49 may be retained on the ear 43 at the front of the contact frame 44 in order to urge the contact frame downwardly to hold the guide 40 in the slot 38 and the contact brushes 41 in contact with the contact strips 39. Such a "floating" mounting for the guide 40 and the contact brushes 41 is desirable because when a slot type racer slews around corners, is fed power in bursts or goes over rough spots in the roadway 37, its tires bounce tends to lift the guide 40 out of the slot 38 or raise the contact brushes 41 to break contact with the continuous contact strips 39, and thus interrupt the flow of power to the motor 34.

Referring now to FIG. 5 of the drawings, there is illustrated a fragmentary portion of a two track roadway 49 which includes both a sharp curved portion and the beginning of a following straightaway. On the roadway 49, there are shown two slot type racing cars, the first being a conventional rear wheel drive car indicated by the reference number 50 and shown in two positions, i.e., while going through the sharp curve and upon entering the straightaway. A second slot type racing car, indicated by the reference number 51, is of the front wheel type embodying the instant invention and is similarly shown in two positions which it assumes while traveling through the sharp curve and entering the straightaway. By comparing the positions of the respective cars 50 and 51, both in the curve and at the entrance to the straightaway, it will be seen how a front wheel drive slot type racing car embodying the invention stays in a position more nearly tangential to the curve and more rapidly aligns with the straightaway immediately after leaving the curve. This reaction follows from the fact that with power supplied to the rear wheels of a slot type racing car of the conventional type, not only does centrifugal force tend to swing the car outwardly relative to the curve which it is traversing, but the resolution of the forces applied to the car by power on the rear wheels tends to augment the "slew" or skid. Indeed, if the curve is entered at too rapid a speed, a rear wheel drive car may be thrown outwardly so far as to cause it to "spin out" or to slew completely broadside to the direction of movement.

In contrast, when the power is applied to the front wheels of the car according to the instant invention, the driving wheels tend to pull the car around so that it more nearly follows the guide shoe which is engaged in the slot. When the racer has come through the curve and is starting to enter the straightaway, because a conventional rear wheel drive racer (as illustrated at the upper right of FIG. 5) has slewed so badly out of line with the track, there is a brief period of time when power applied at this point to the rear wheels may tend, indeed, to throw the car more widely out of line. In any event, the wheels at this point are very inclined to spin, losing power to the car and only gradually pulling it back in line with the straightaway. In contrast, in the front wheel drive racer according to the invention, the car is again pulled more quickly into line with the straightaway so that almost immediately upon leaving the curved portion and entering the straightaway, the car is directly aligned with the slot and the direction of desired movement.

In addition, in a front wheel drive racer according to the invention, when power is applied to the high torque electric motor and thus to the front wheels, the leverage is such that, much less force of reaction exists to lift the guide 40 and the contact brushes 41 out of contact with the continuous strips 39 then is the case when power is applied to the rear wheels. Because the drive is applied to the front axle of the car, the weight of the motor can be positioned forwardly of the center of distance between the two axles of the car, and thus a far greater proportion of its weight is borne by the front axle and the front tires. This also acts to hold the tires in contact with the roadway, to decrease their slippage and to retain a more positive contact of the contact brushes with the continuous contact strips. The several points just mentioned result in a front wheel drive slot type racing car embodying the invention maintaining a much more positive contact both electrically and frictionally during the entire traverse of the roadway.

FIG. 6 is a fragmentary, vertical, cross section, illustrating a simple means whereby power is applied to only one of the driving wheels, thus improving the traction of the vehicle while taking a sharp curve, by eliminating the skidding of at least one of the tires which must result where power is applied to both of the wheels.

In this improvement according to the invention, one of the front wheels 52 is mounted directly on an axle 53 which extends through and is rotatable relative to a tube 54. Graphite or similar lubricant may be inserted between their two relatively rotatable surfaces. At its outer end, the tube 54 is threaded to receive a larger threaded bore of a wheel disc 55 of a second front wheel 56. At its inner end, the tube 54 carries a driven ring gear 57 which is meshed with a pinion 58 on a motor shaft 59. An enlarged head 60 on the end of the axle 53 opposite the wheel 52 which is threaded thereon, bears against the outer end of the tube 54. The resultant thrust of the pinion 58 against the gear 57 holds the tube 54 outwardly against the head 60. In this modification of the front wheel drive embodying the invention, power is applied only to the one front wheel 56. When the slot type racing car is moving through a curve where one of the wheels must rotate more rapidly than the other, the freely rotating wheel 52 can compensate for this differential without causing skidding. This differential action when coupled, particularly, with a front wheel drive according to the invention, further reduces the tendency of a slot type racing car embodying the invention to skid or slew either when traveling through or coming out of a sharp curve.

In the modification of the invention illustrated in FIG. 7, a still further improvement in differential drive means for front drive slot type racer embodying the invention is illustrated. In this modification, an axle 61, rotatably mounted on a frame 62 by bearings 63 is rotated by a driven gear 64 meshed with a drive pinion 65 mounted on a motor shaft 66.

The ends of the axle 61 are threaded to receive drive discs 67 which are separated from the bearings 63 by spacers 68. Sleeves 69 fit rotatably over the threaded portions of the axle 61 engaging the outer sides of the discs 67 and extending outwardly almost to the ends of the axle 61. Front wheels 70 are rotatably mounted on the sleeves 69. Each of the wheels 70 has a hub 71, flange 72 and rim 73 and mounts a tire 74 which has a tread portion 75 and an inner side wall 76 terminating at the wheel hub 71. A coil spring 77 extends around each of the sleeves 69 being lightly compressed between the outer end of the respective hub 71 and a lug nut 78 tightened on the end of the axle 61 against the sleeve 69.

Each of the drive disks 67 are slightly dish shaped to provide an annular radial flange 79 of such size as to engage with the inner portion of the sidewall 76 of its respective tire 74. Each of the front wheels 70 is urged into frictional engagement with its respective drive disk 67 by the coil spring 77. The materials from which the drive disk 67 and the tire 74 are fabricated may be selected from materials which have relatively high coefficients of friction one to the other as to provide for the transmission of drive power from the axle 61 through the drive disc 67 to the respective front wheels 70. For example, both the drive disc 67 and the tires 74 may be molded from silicone rubber, the drive disc 67 being tougher and the tire 74 being softer. Other combinations such as metal to rubber etc. may also be employed.

When a car equipped with the differential drive means illustrated in FIG. 7 enters the beginning of a curve of a roadway, the wheel which is at the outer side of the curve is pulled outwardly against the compression of the coil spring 77 disengaging or reducing the frictional engagement of its drive disc 67 and its tire 74 while at the same time, at the inner side of the curve, the wheel 70 is thrust into a tighter frictional engagement with its respective drive wheel. Thus, power is applied primarily or only to the wheel at the inner side of the curve. This eliminates the rotary skidding of the tire at the outer side of the curve and increases the speed of movement of the car relative to the curve by applying power to the wheel which has the lesser distance to travel. As the car leaves the curve and re-enters the straightaway, the resolution of the forces is such that no force now acts to separate the wheel 70 which was at the outer side of the curve and the coil spring 77 again squeezes its respective tire 74 against its drive disc 67 to restore the application of power to both front wheels.

Power from the pinion 65 is transmitted by the gear 64 to the front axle 61 and, by reason of the high friction between the drive collars 68 and the drive discs 67, power is transmitted to the front wheels 75. Power is applied only to the wheel at the inner side of the curve, not only eliminating the skidding of the other wheel but increasing the speed by rotating the wheel which has the lesser distance to travel.

Having described my invention, I claim:

1. A model racing car of the type designed to be guided along a slotted raceway, said car comprising in combination, a generally horizontally extending frame, front and rear axles mounted by said frame, road wheels journaled for rotation adjacent the ends of said axles, a motor mounted on said frame adjacent said front axle whereby the center of gravity of said racing car is toward the front of said car, means operatively connecting said motor in driving relationship to said front axle, a slot guide pivotally mounted on said frame at a position forward of said front axle, and differential means for applying power on curves to the inside one of said front road wheels, said differential means comprising a drive member coupled to and rotatable with said driven front axle adjacent the inner side of each of said front road wheels, and means normally biasing each of said front road wheels into frictional engagement with a respective one of said drive members, whereby axial forces upon said wheels caused by curves in said slotted raceway will reduce the frictional engagement of the outside one of said road wheels with its respective drive member and will cause power to be applied to the inside one of said road wheels such that racing car drive control and racing car electrical control is substantially maintained upon lateral movement of the rear end of the model racing car.

2. A model racing car according to claim 1 in which the drive members have outer friction surfaces engageable with the inner surfaces of the road wheels and the biasing means are springs located on the axle between a hub nut and the outer sides of said front road wheels and urging said front road wheels inwardly against the drive members.

References Cited by the Examiner

UNITED STATES PATENTS

| | | | |
|---|---|---|---|
| 2,226,759 | 12/1940 | Fitzner | 180—76 |
| 3,086,319 | 4/1963 | Frisbie et al. | 46—244 |
| 3,159,109 | 12/1964 | Braverman | 46—243 X |

RICHARD C. PINKHAM, *Primary Examiner.*

DELBERT B. LOWE, R. F. CUTTING,
*Assistant Examiners.*